US011466185B2

(12) United States Patent
Onishi et al.

(10) Patent No.: US 11,466,185 B2
(45) Date of Patent: *Oct. 11, 2022

(54) OPTICAL TRANSPARENT ADHESIVE SHEET, METHOD FOR PRODUCING OPTICAL TRANSPARENT ADHESIVE SHEET, LAMINATE AND DISPLAY DEVICE WITH TOUCH PANEL

(71) Applicant: BANDO CHEMICAL INDUSTRIES, LTD., Hyogo (JP)

(72) Inventors: Jun Onishi, Hyogo (JP); Yuki Hosokawa, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/572,485

(22) PCT Filed: Apr. 28, 2016

(86) PCT No.: PCT/JP2016/063355
§ 371 (c)(1),
(2) Date: Nov. 7, 2017

(87) PCT Pub. No.: WO2016/181857
PCT Pub. Date: Nov. 17, 2016

(65) Prior Publication Data
US 2018/0112112 A1  Apr. 26, 2018

(30) Foreign Application Priority Data

May 8, 2015  (JP) .............................. JP2015-095952
Sep. 28, 2015  (JP) .............................. JP2015-189856

(51) Int. Cl.
| | | |
|---|---|---|
| C09J 175/04 | (2006.01) | |
| C08G 18/62 | (2006.01) | |
| C08G 18/32 | (2006.01) | |
| C08G 18/40 | (2006.01) | |
| C09J 7/10 | (2018.01) | |
| C08G 18/80 | (2006.01) | |
| C08G 18/44 | (2006.01) | |
| G06F 3/041 | (2006.01) | |
| C08G 18/64 | (2006.01) | |
| C08G 18/75 | (2006.01) | |
| C08G 18/73 | (2006.01) | |
| C09J 7/35 | (2018.01) | |
| C09J 7/40 | (2018.01) | |
| C08G 18/70 | (2006.01) | |
| C08K 5/00 | (2006.01) | |
| C08K 5/09 | (2006.01) | |
| C09J 11/08 | (2006.01) | |
| G06F 3/042 | (2006.01) | |

(52) U.S. Cl.
CPC ........ *C09J 175/04* (2013.01); *C08G 18/3206* (2013.01); *C08G 18/4081* (2013.01); *C08G 18/44* (2013.01); *C08G 18/6204* (2013.01); *C08G 18/6212* (2013.01); *C08G 18/6492* (2013.01); *C08G 18/70* (2013.01); *C08G 18/73* (2013.01); *C08G 18/755* (2013.01); *C08G 18/8009* (2013.01); *C08K 5/0016* (2013.01); *C08K 5/09* (2013.01); *C09J 7/10* (2018.01); *C09J 7/35* (2018.01); *C09J 7/40* (2018.01); *C09J 11/08* (2013.01); *G06F 3/041* (2013.01); *G06F 3/042* (2013.01); *C09J 2203/318* (2013.01); *C09J 2475/00* (2013.01); *Y10T 428/2896* (2015.01)

(58) Field of Classification Search
None
See application file for complete search history.

(56) References Cited

U.S. PATENT DOCUMENTS

| | | | | |
|---|---|---|---|---|
| 3,914,484 | A | * | 10/1975 | Creegan ..................... C09J 7/21 |
| | | | | 428/41.5 |
| 4,025,579 | A | | 5/1977 | Gruber et al. |
| 4,705,721 | A | | 11/1987 | Frisch et al. |
| 5,252,155 | A | | 10/1993 | Nowicki et al. |

(Continued)

FOREIGN PATENT DOCUMENTS

| | | |
|---|---|---|
| CA | 2696968 | 2/2009 |
| CN | 1037523 | 11/1989 |

(Continued)

OTHER PUBLICATIONS

Higuchi, Daichi et al., abstractor JP 2013-018856 A, published Jan. 31, 2013. (Year: 2013).*
Higuchi, Daichi et al., English translation of JP 2013-018856 A, published Jan. 31, 2013. (Year: 2013).*
Nakajima, Yuji et al., "Polyurethane Resin Forming Composition For Optical Member", machine translation of JP 2013-136731A, Jul. 11, 2013. (Year: 2013).*

(Continued)

*Primary Examiner* — Anish P Desai
(74) *Attorney, Agent, or Firm* — JCIPRNET

(57) ABSTRACT

The present invention provides an optically clear adhesive sheet having excellent environment resistance using a heat-curable polyurethane composition that has excellent flexibility and is capable of giving a thick film. The optically clear adhesive sheet of the present invention is formed of: a cured product of a heat-curable polyurethane composition, the heat-curable polyurethane composition containing a polyol component, a polyisocyanate component, and a tackifier, the polyol component having an olefin skeleton, the polyisocyanate component being a modified polyisocyanate that is obtained by reacting an acyclic aliphatic and/or alicyclic polyisocyanate containing an isocyanate group with an ether compound containing an ethylene oxide unit.

6 Claims, 2 Drawing Sheets

(56) References Cited

U.S. PATENT DOCUMENTS

| | | | | |
|---|---|---|---|---|
| 5,486,570 | A | * | 1/1996 | St. Clair ............ C08G 18/2815 |
| | | | | 525/123 |
| 5,646,229 | A | * | 7/1997 | Kudo ..................... C08G 18/10 |
| | | | | 528/44 |
| 7,070,862 | B1 | | 7/2006 | Miyakawa et al. |
| 2006/0022309 | A1 | | 2/2006 | Tokunaga et al. |
| 2008/0280074 | A1 | | 11/2008 | Sugino et al. |
| 2010/0040842 | A1 | | 2/2010 | Everaerts et al. |
| 2010/0216905 | A1 | | 8/2010 | Kuwamura et al. |
| 2011/0003146 | A1 | | 1/2011 | Qiu et al. |
| 2012/0000603 | A1 | * | 1/2012 | Karafilidis .............. A61L 15/26 |
| | | | | 156/331.7 |
| 2013/0115405 | A1 | * | 5/2013 | Kinzelmann ............. B32B 7/12 |
| | | | | 428/57 |
| 2014/0017467 | A1 | | 1/2014 | Inao et al. |
| 2014/0329927 | A1 | | 11/2014 | Ha et al. |
| 2018/0112112 | A1 | | 4/2018 | Onishi et al. |
| 2018/0282586 | A1 | | 10/2018 | Hosokawa et al. |
| 2018/0354229 | A1 | | 12/2018 | Onishi et al. |
| 2019/0039363 | A1 | | 2/2019 | Nakane et al. |
| 2019/0048234 | A1 | | 2/2019 | Nakane et al. |
| 2019/0194498 | A1 | | 6/2019 | Takagi et al. |

FOREIGN PATENT DOCUMENTS

| | | |
|---|---|---|
| CN | 1726250 | 1/2006 |
| CN | 101784593 | 7/2010 |
| CN | 103314068 | 9/2013 |
| CN | 104093800 | 10/2014 |
| CN | 108292178 | 7/2018 |
| EP | 1864655 | 12/2007 |
| EP | 3296373 | 3/2018 |
| EP | 3357985 | 8/2018 |
| EP | 3382517 | 10/2018 |
| EP | 3412740 | 12/2018 |
| JP | H09183963 | 7/1997 |
| JP | H11263961 | 9/1999 |
| JP | 2011-074333 | 4/2011 |
| JP | 2012-021104 | 2/2012 |
| JP | 2012121978 | 6/2012 |
| JP | 2013-018856 | 1/2013 |
| JP | 2013018871 | 1/2013 |
| JP | 2013116942 | 6/2013 |
| JP | 2013-136731 | 7/2013 |
| JP | 2013212694 | 10/2013 |
| JP | 2013213159 | 10/2013 |
| JP | 2014148078 | 8/2014 |
| JP | 2014148081 | 8/2014 |
| JP | 2014152198 | 8/2014 |
| JP | 2014196442 | 10/2014 |
| JP | 2015030766 | 2/2015 |
| JP | 2015040240 | 3/2015 |
| JP | 2015083381 | 4/2015 |
| JP | 2015120819 | 7/2015 |
| JP | 2015160905 | 9/2015 |
| JP | 2015189852 | 11/2015 |
| JP | 2015208898 | 11/2015 |
| JP | 2015209538 | 11/2015 |
| JP | 2016141687 | 8/2016 |
| JP | 2016141688 | 8/2016 |
| JP | 5987135 | 9/2016 |
| JP | 2017008193 | 1/2017 |
| JP | 2014142192 | 2/2017 |
| KR | 20070110433 | 11/2007 |
| KR | 1020140029254 | 3/2014 |
| NL | 7511615 | 4/1976 |
| TW | 200927779 | 7/2009 |
| WO | 2004052970 | 6/2004 |
| WO | 2011158839 | 12/2011 |
| WO | 2012132520 | 10/2012 |
| WO | 2013088889 | 6/2013 |
| WO | 2013115250 | 8/2013 |
| WO | 2013161812 | 10/2013 |
| WO | 2014142192 | 9/2014 |
| WO | 2015016106 | 2/2015 |
| WO | 2015190558 | 12/2015 |
| WO | 2016181857 | 11/2016 |

OTHER PUBLICATIONS

Higuchi, Daichi et al., "Two-Liquid Hardening Polyurethane Resin Composition And Adhesive Film Obtained By Using The Same", English translation of JP 2013-018856A, Jan. 31, 2013. (Year: 2013).*

Yuji, Nakajima et al., "Polyurethane Resin-Forming Composition For Optical Component", English translation of JP2013-136731A, Jul. 11, 2013 (Year: 2013).*

Susumu, Emoto et al., English translation of JP 11152321A, Jun. 8, 1999 (Year: 1999).*

"International Search Report (Form PCT/ISA/210) of PCT/JP2016/063355," dated Jul. 12, 2016, with English translation thereof, pp. 1-4.

"Decision on Opposition of Japan Related Application," issued on Oct. 8, 2019, with partial English translation thereof, p. 1-p. 39.

"Notification of Reasons for Revocation of Japan Related Application," dated Apr. 25, 2019, with English translation thereof, p. 1-p. 20.

"Response to Notification of Reasons for Revocation of Related Counterpart Application," filed on Jun. 20, 2019, with partial English translation thereof, p. 1-p. 23.

"International Search Report (Form PCT/ISA/210) of PCT/JP2017/029447," dated Oct. 24, 2017, with English translation thereof, pp. 1-3.

"Notification of Reasons for Refusal of Japan Related Application," dated Nov. 14, 2017, with English translation thereof, p. 1-p. 4.

"International Search Report (Form PCT/ISA/210)" of PCT/JP2016/078213, dated Oct. 25, 2016, with English translation thereof, pp. 1-4.

"International Search Report (Form PCT/ISA/210)" of PCT/JP2016/083674, dated Dec. 20, 2016, with English translation thereof, pp. 1-4.

"International Search Report (Form PCT/ISA/210) of PCT/JP2017/001680", dated Mar. 14, 2017, with English translation thereof, pp. 1-4.

"International Search Report (Form PCT/ISA/210)of PCTIJP2017/001701", dated Mar. 7, 2017, with English translation thereof, pp. 1-6.

* cited by examiner

OPTICAL TRANSPARENT ADHESIVE SHEET, METHOD FOR PRODUCING OPTICAL TRANSPARENT ADHESIVE SHEET, LAMINATE AND DISPLAY DEVICE WITH TOUCH PANEL

CROSS-REFERENCE TO RELATED APPLICATION

This application is a 371 application of International PCT application serial no. PCT/JP2016/063355, filed on Apr. 28, 2016, which claims the priority benefit of Japan application no. 2015-189856, filed on Sep. 28, 2015, and Japan application no. 2015-095952, filed on May 08, 2015. The entirety of each of the above-mentioned patent applications is hereby incorporated by reference herein and made a part of this specification.

TECHNICAL FIELD

The present invention relates to optically clear adhesive sheets, methods for producing an optically clear adhesive sheet, laminates, and display devices with a touchscreen.

BACKGROUND ART

Optically clear adhesive (OCA) sheets are transparent adhesive sheets used to bond optical members to each other. A recent rapid increase in demand for touchscreens in the fields of smartphones, tablet PCs, handheld game consoles, and automotive navigation systems is accompanied by an increase in demand for OCA sheets used to bond a touchscreen to another optical member. A typical display device with a touchscreen has a structure in which optical members including a display panel (e.g., liquid crystal panel), a transparent member (touchscreen main unit) having on its outer surface a transparent conductive film formed of a material such as indium tin oxide (ITO), and a cover panel that protects the transparent conductive film are stacked, with OCA sheets used to bond these optical members to each other. In between the display panel and the touchscreen main unit, however, is typically an air layer called an air gap but no OCA sheet because there is a gap larger than gaps between the other optical members due to the edge of a bezel, which is the housing of the display panel.

Known OCA sheets include those formed of a silicone resin composition or an acrylic resin composition, for example. OCA sheets formed of silicone resin have low adhesive strength and thus unfortunately allow air to enter a gap between optical members. This may cause problems such as deterioration of the display screen visibility. In OCA sheets formed of acrylic resin, acrylic acid remaining in the acrylic resin or acid components generated through hydrolysis may unfortunately corrode metals used in optical members. In addition, in the case where the acrylic resin composition is a UV-curing resin composition, a thick OCA sheet may be difficult to obtain because free radicals in the acrylic resin, which are necessary in the curing reaction, may be consumed in the outer layer part under UV light, leaving the bottom part uncured.

Patent Literature 1 discloses a technique to deal with these problems, which is to use a polyurethane resin-forming composition containing a modified polyisocyanate and a polyol containing a liquid polycarbonate diol, for OCA sheets.

Also, Patent Literature 2 discloses a urethane-based moisture-curable adhesive composition containing a specific urethane prepolymer, a specific olefin-based polyol, and specific adhesion-imparting resins, with an aim of obtaining a moisture-curable adhesive exhibiting improved adhesion to an olefin-based resin or a polyester-based resin.

CITATION LIST

Patent Literature

Patent Literature 1: JP 2013-136731 A
Patent Literature 2: JP 2012-21104 A

SUMMARY OF INVENTION

Technical Problem

An air gap, which is an air layer, formed between optical members causes interfacial reflection because there are differences in refractive index between the air layer and the optical members. Such interfacial reflection deteriorates visibility of the display panel. This disadvantage has led to a demand for a thick OCA sheet suited to bonding of a display panel and a touchscreen main unit. Also, an OCA sheet used to bond a display panel and a touchscreen main unit is required to conform to an uneven surface on which the thick bezel is present. Accordingly, an OCA sheet has been desired which exhibits excellent flexibility (capability to conform to uneven surfaces) and can be made thick.

The key characteristic for OCA sheets is the adhesive strength which is typically evaluated based on the adhesive strength to glass. OCA sheets are also desired to have physical properties resistant to usage environment changes.

In studies to solve those problems, the inventors have focused on a solvent-free heat-curable polyurethane composition as a material of an OCA sheet that exhibits excellent flexibility and can be made thick. The inventors have then found that sufficient adhesive strength can also be imparted to the OCA sheet by adding a tackifier (adhesion-imparting agent) to the heat-curable polyurethane composition.

To further advance the development, the inventors have made various studies on a method for producing an OCA sheet having excellent environment resistance using a heat-curable polyurethane composition. As a result, they have found that in the case of using a polycarbonate-based polyol as a polyol component, which is a material of a heat-curable polyurethane composition, the resulting OCA sheet has excellent environment resistance but is likely to have a problem of air bubbles at the interface with a glass plate when the OCA sheet is bonded to the glass plate and subjected to accelerated environmental testing in an environment such as a high-temperature, high-humidity environment (temperature: 85° C., • humidity: 85%) or a high-temperature, normal-humidity environment (temperature: 95° C.). The air bubbles are presumed to be caused mainly by a gas generated inside the OCA sheet. The outgassing here is presumed to be caused by moisture and organic components, mainly moisture. Another possible cause of the air bubbles is the poor wettability of heat-curable polyurethane compositions containing a polycarbonate-based polyol with glass due to the relatively high polarity of the compositions, which makes the compositions vulnerable to elastic deformation at high temperatures.

Meanwhile, in the case where a polyether-based polyol is used as a polyol component, the resulting OCA sheet was found to have excellent hydrolysis resistance that makes the sheet superior in a high-humidity environment. However, such an OCA sheet was found to have low heat resistance with which the OCA sheet is unfortunately heat-deteriorated and partially melted to come out of the product including the sheet. Also, in the case where a polyolefin-based polyol is used as a polyol component, the resulting OCA sheet was found to have good heat resistance and hydrophobicity and can therefore prevent outgassing caused by moisture. However, such an OCA sheet was found to be likely to turn white in a high-temperature, high-humidity environment.

The present invention has been made in view of the above current state of the art, and aims to provide an optically clear adhesive sheet having excellent environment resistance using a heat-curable polyurethane composition that has excellent flexibility and is capable of giving a thick film.

Solution to Problem

The inventors have made studies on an optically clear adhesive sheet having excellent environment resistance. As a result, they have arrived at using a polyolefin-based polyol as a polyol component and using as a polyisocyanate component a modified polyisocyanate obtained by reacting an acyclic aliphatic and/or alicyclic polyisocyanate containing an isocyanate group with an ether compound having an ethylene oxide unit. Use of these components has been found to prevent both outgassing and whitening, enabling production of an optically clear adhesive sheet having excellent resistance to environments such as a high-temperature, high-humidity environment and a high-temperature, normal-humidity environment. Thereby, the inventors have accomplished the present invention.

The optically clear adhesive sheet of the present invention is an optically clear adhesive sheet formed of: a cured product of a heat-curable polyurethane composition, the heat-curable polyurethane composition containing a polyol component, a polyisocyanate component, and a tackifier, the polyol component having an olefin skeleton, the polyisocyanate component being a modified polyisocyanate that is obtained by reacting an acyclic aliphatic and/or alicyclic polyisocyanate containing an isocyanate group with an ether compound containing an ethylene oxide unit.

The tackifier preferably contains at least one of an alicyclic saturated hydrocarbon resin and a hydrogenated petroleum resin obtained by hydrogenating a copolymer of dicyclopentadiene and an aromatic compound.

The heat-curable polyurethane composition preferably further contains a plasticizer. The plasticizer preferably contains a carboxylic acid-based plasticizer.

The method for producing an optically clear adhesive sheet according to the present invention is a method for producing the optically clear adhesive sheet of the present invention, the method including the steps of: preparing the heat-curable polyurethane composition by mixing the polyol component, the polyisocyanate component, and the tackifier with stirring; and curing the heat-curable polyurethane composition.

The laminate of the present invention is a laminate including: the optically clear adhesive sheet of the present invention; a first release liner covering one surface of the optically clear adhesive sheet; and a second release liner covering the other surface of the optically clear adhesive sheet.

The display device with a touchscreen according to the present invention includes: the optically clear adhesive sheet of the present invention; a display panel; and a touchscreen.

Advantageous Effects of Invention

The optically clear adhesive sheet of the present invention prevents both outgassing and whitening and thus has excellent resistance to environments such as a high-temperature, high-humidity environment and a high-temperature, normal-humidity environment, while retaining the superior properties of a heat-curable polyurethane composition having excellent flexibility and being capable of giving a thick film. The optically clear adhesive sheet of the present invention bonded to glass can achieve a lasting, stable bonding interface. The optically clear adhesive sheet of the present invention is therefore suited to use in displays and tablet PCs, for example.

The method for producing an optically clear adhesive sheet according to the present invention enables suitable production of the above optically clear adhesive sheet. The laminate of the present invention can improve the handleability of the optically clear adhesive sheet of the present invention. The display device with a touchscreen according to the present invention can improve the visibility of the display screen.

DESCRIPTION OF EMBODIMENTS

Figure 1:
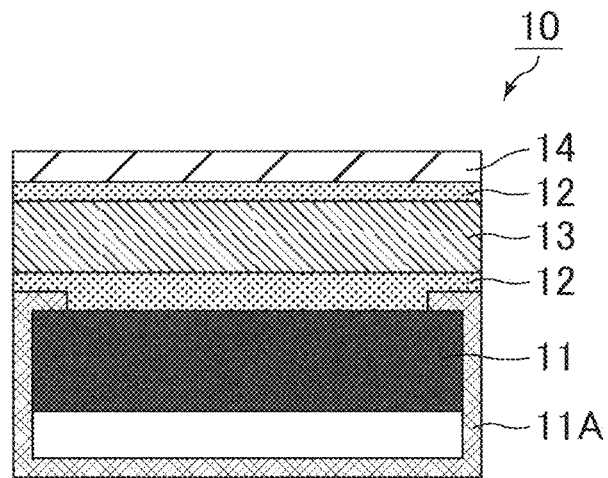
FIG. 1 shows a schematic cross-sectional view of an exemplary display device with a touchscreen which includes the optically clear adhesive sheet of the present invention.

The optically clear adhesive sheet of the present invention is an optically clear adhesive sheet formed of a cured product of a heat-curable polyurethane composition. The heat-curable polyurethane composition contains a polyol component, a polyisocyanate component, and a tackifier. The polyol component has an olefin skeleton. The polyisocyanate component is a modified polyisocyanate that is obtained by reacting an acyclic aliphatic and/or alicyclic polyisocyanate containing an isocyanate group with an ether compound containing an ethylene oxide unit. The "optically clear adhesive sheet" as used herein has the same meaning as an "optically clear adhesive film".

The optically clear adhesive sheet of the present invention is formed of a cured product of a heat-curable polyurethane composition, and the heat-curable polyurethane composition contains a polyol component and a polyisocyanate component. The cured product of a heat-curable polyurethane composition is obtained by reacting the polyol component and the polyisocyanate component and has a structure represented by the following formula (A).

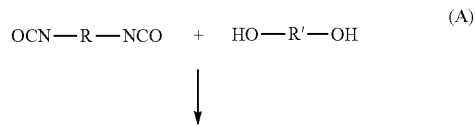

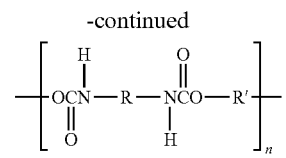

In the formula (A), R represents a non-NCO-group moiety of a polyisocyanate component, R' represents a non-OH-group moiety of a polyol component, and n represents the number of repeating units.

The cured product of a heat-curable polyurethane composition is preferably not an acrylic-modified one, and preferably contains no moiety derived from, for example, an acrylic ester or a methacrylic ester in the main chain. An acrylic-modified cured product of a heat-curable polyurethane composition is hydrophobic and is thus likely to cause moisture condensation in a high-temperature, high humidity environment. The moisture condensation may cause defects such as whitening and foaming to deteriorate the optical characteristics. With a non-acrylic-modified cured product of a heat-curable polyurethane composition, deterioration of the optical characteristics due to defects such as whitening and foaming in high-temperature, high-humidity environments can be prevented.

Both the polyol component and the polyisocyanate component can be components that are liquids at normal temperature (23° C.), so that a cured product of a heat-curable polyurethane composition can be obtained without a solvent. Other components such as a tackifier can be added to the polyol component or the polyisocyanate component, and are preferably added to the polyol component. Production of an optically clear adhesive sheet using a cured product of a heat-curable polyurethane composition, which requires no removal of a solvent, enables formation of a thick sheet with an even surface. The optically clear adhesive sheet of the present invention, when used to bond a display panel and a transparent member (touchscreen) having on its outer surface a transparent conductive film, can therefore conform to an uneven surface on which the bezel is present. Also, the optically clear adhesive sheet of the present invention can keep its optical characteristics even in the case of having a large thickness, and thus can sufficiently prevent transparency decrease (haze increase), coloring, and foaming (generation of air bubbles at the interface with the adherend).

Being formed of a cured product of a heat-curable polyurethane composition and flexible, the optically clear adhesive sheet of the present invention under tensile stress is elongated well and very unlikely to be torn. The optically clear adhesive sheet can therefore be peeled off without adhesive residue. Since the optically clear adhesive sheet of the present invention can be made thick while being flexible, the optically clear adhesive sheet is excellent in shock resistance and can be used to bond a transparent member having a transparent conductive film on its outer surface to a cover panel. In the case of using an additional member, the optically clear adhesive sheet can also be used to bond the display panel or the transparent member having a transparent conductive film on its outer surface to the additional member. The optically clear adhesive sheet of the present invention, being formed of a cured product of a heat-curable polyurethane composition, has a high dielectric constant and can give a higher capacitance than conventional optically clear adhesive sheets formed of an acrylic resin composition. The optically clear adhesive sheet of the present invention is therefore suitable for bonding of a capacitive touchscreen.

[Polyol Component]

The polyol component has an olefin skeleton, meaning that its main chain includes a polyolefin or a derivative thereof. Examples of the polyol component having an olefin skeleton include polybutadiene-based polyols such as 1,2-polybutadiene polyol, 1,4-polybutadiene polyol, 1,2-polychloroprene polyol, and 1,4-polychloroprene polyol, polyisoprene-based polyols, and saturated compounds obtained by adding hydrogen or halogen atoms to the double bonds of these polyols, for example. The polyol component may be a polyol obtained by copolymerizing a polybutadiene-based polyol, for example, with an olefin compound (e.g., styrene, ethylene, vinyl acetate, or acrylic ester) or a hydrogenated compound thereof. The polyol component may have a linear or branched structure. These compounds for the polyol component may be used alone or in combination with each other.

The polyol component preferably has a number average molecular weight in the range of 300 to 5000. If the polyol component has a number average molecular weight of less than 300, the polyol component and the polyisocyanate component may react with each other very fast and the resulting cured product of a heat-curable polyurethane composition may be difficult to mold into a sheet with an even surface or the cured product of a heat-curable polyurethane composition may be less flexible and fragile. If the polyol component has a number average molecular weight of more than 5000, problems may arise such as that the polyol component may have a very high viscosity to make it difficult to mold the cured product of a heat-curable polyurethane composition into a sheet with an even surface and that the cured product of a heat-curable polyurethane composition may crystallize to make the product opaque. The polyol component more preferably has a number average molecular weight in the range of 500 to 3000.

Known examples of the polyol component having an olefin skeleton include a polyolefin polyol obtained by hydrogenating a hydroxy group-terminated polyisoprene ("EPOL®" available from Idemitsu Kosan Co., Ltd., number average molecular weight: 2500), both-end hydroxy group-terminated hydrogenated polybutadiene ("GI-1000" available from Nippon Soda Co., Ltd., number average molecular weight: 1500), and polyhydroxy polyolefin oligomer ("POLYTAIL®" available from Mitsubishi Chemical Corporation).

[Polyisocyanate Component]

The polyisocyanate component is a modified polyisocyanate obtained by reacting an acyclic aliphatic and/or alicyclic polyisocyanate containing an isocyanate group with an ether compound having an ethylene oxide unit. An acyclic aliphatic and/or alicyclic polyisocyanate can reduce the chances of coloring or discoloration of the optically clear adhesive sheet and enables the optically clear adhesive sheet to exhibit long-lasting transparency with higher reliability. Also, being modified with an ether compound having an ethylene oxide unit, the polyisocyanate component can prevent whitening owing to its hydrophilic moiety (ethylene oxide unit) and can exhibit compatibility with low-polarity components such as a tackifier and a plasticizer owing to its hydrophobic moiety (the other units).

The "acyclic aliphatic and/or alicyclic polyisocyanate" refers to one or more of the following: aliphatic diisocyanates, alicyclic diisocyanates, and polyisocyanates synthesized from starting materials of acyclic aliphatic and/or alicyclic diisocyanates.

Specific examples of the aliphatic polyisocyanate and alicyclic polyisocyanate include hexamethylene diisocyanate (HDI), tetramethylene diisocyanate, 2-methyl-pentane-1,5-diisocyanate, 3-methyl-pentane-1,5-diisocyanate, lysine diisocyanate, trioxyethylene diisocyanate, isophorone diisocyanate, cyclohexyl diisocyanate, 4,4'-dicyclohexylmethane diisocyanate, norbornane diisocyanate, hydrogenated tolylene diisocyanate, hydrogenated xylene diisocyanate, hydrogenated tetramethyl xylene diisocyanate, and modified products thereof. These compounds may be used alone or in combination with each other. Preferred among these specific examples are hexamethylene diisocyanate, isophorone diisocyanate, and modified products thereof, with hexamethylene diisocyanate and modified products thereof being particularly preferred. Examples of the modified products of hexamethylene diisocyanate include isocyanurate-modified, allophanate-modified, or urethane-modified products of hexamethylene diisocyanate.

Examples of the ether compound having an ethylene oxide unit include alcohol-ethylene oxide adducts, phenol-ethylene oxide adducts, or amine-ethylene oxide adducts. In order to improve the hydrophilicity, ether compounds having six or more ethylene oxide units per molecule are preferred.

Examples of the alcohol include monovalent alcohols, divalent alcohols (e.g., ethylene glycol, diethylene glycol, propylene glycol, dipropylene glycol, 1,4-butanediol, 1,6-hexanediol, 1,3-butylenediol, neopentyl glycol), and trivalent alcohols (e.g., glycerol, trimethylol propane). These may be used alone or in combination with each other.

Examples of the phenol include hydroquinone, bisphenols (e.g., bisphenol A, bisphenol F), and phenol-formaldehyde condensates with a low condensation degree (novolac resin and resol prepolymers). These may be used alone or in combination with each other.

The ethylene oxide unit content is preferably in the range of 1 to 20 wt % of the entire heat-curable polyurethane composition. If the ethylene oxide unit content is lower than 1 wt %, whitening may not be sufficiently prevented. If the ethylene oxide unit content is higher than 20 wt %, the compatibility with the low-polarity components such as a tackifier and a plasticizer may be low and thus the optical characteristics such as haze may be poor.

The number of isocyanate groups per molecule of the modified polyisocyanate is preferably 2.0 or more on average. If the number of isocyanate groups is less than 2.0 on average, the crosslinking density may be low, leading to insufficient curing of the heat-curable polyurethane composition.

The heat-curable polyurethane composition as used herein has an α ratio (the number of moles of OH groups derived from polyol component/the number of moles of NCO groups derived from polyisocyanate component) of 1 or higher. An α ratio of lower than 1 suggests that the amount of the polyisocyanate component is excessive for the amount of the polyol component and thus the cured product of a heat-curable polyurethane composition is rigid, which makes it difficult to achieve the flexibility required for the optically clear adhesive sheet. With a low flexibility, an optically clear adhesive sheet cannot conform to a rough, uneven bonding surface of the adherend, especially an optical member such as a touchscreen. Also, the adhesive strength required for the optically clear adhesive sheet would not be ensured. The α ratio more preferably satisfies the inequality $1<\alpha<2.0$. If the α ratio is 2.0 or higher, the heat-curable polyurethane composition may not be sufficiently cured.

[Tackifier]

The heat-curable polyurethane composition of the present invention further contains a tackifier (adhesive-imparting agent). A tackifier is an additive that is added to enhance the adhesive strength, and is typically an amorphous oligomer having a molecular weight of several hundreds to several thousands which is a thermoplastic resin in a liquid or solid state at normal temperature. A heat-curable polyurethane composition containing a tackifier imparts a sufficient adhesive strength to each surface of an optically clear adhesive sheet formed of a cured product of the heat-curable polyurethane composition.

Examples of the tackifier include, but are not particularly limited to, petroleum resin-based tackifiers, hydrocarbon resin-based tackifiers, rosin-based tackifiers, and terpene-based tackifiers. These may be used alone or in combination with each other.

The tackifier is preferably a petroleum resin-based tackifier because it has excellent compatibility with the polyol component having an olefin skeleton. An especially preferred petroleum resin-based tackifier is a hydrogenated petroleum resin obtained by hydrogenating a copolymer of dicyclopentadiene and an aromatic compound. Dicyclopentadiene is obtainable from a C5 fraction. Examples of the aromatic compound include vinyl aromatic compounds such as styrene, α-methylstyrene, and vinyl toluene. The ratio of dicyclopentadiene to a vinyl aromatic compound is not particularly limited, but the ratio by weight of dicyclopentadiene to a vinyl aromatic compound (dicyclopentadiene: vinyl aromatic compound) is preferably 70:30 to 20:80, more preferably 60:40 to 40:60. The hydrogenated petroleum resin has a softening point of preferably 90° C. to 160° C., a vinyl aromatic compound unit content of preferably 35 weight % or less, a bromine value of preferably 0 to 30 g/100 g, and a number average molecular weight of preferably 500 to 1100. Known examples of the hydrogenated petroleum resin include "I-MARV P-100" available from Idemitsu Kosan Co., Ltd.

The tackifier is also preferably a hydrocarbon resin-based tackifier because it has excellent compatibility with the polyol component having an olefin skeleton. An especially preferred hydrocarbon resin-based tackifier is an alicyclic saturated hydrocarbon resin. Known examples of the alicyclic saturated hydrocarbon resin include "ARKON P-100" available from Arakawa Chemical Industries, Ltd.

The tackifier preferably has an acid value of 1 mgKOH/g or less. The tackifier with an acid value of 1 mgKOH/g or less can be sufficiently prevented from inhibiting the reaction between the polyol component and the polyisocyanate component. The tackifier preferably has a softening point in the range of 80° C. to 120° C., more preferably in the range of 80° C. to 100° C. With a softening point in the range of 80° C. to 120° C., heat deterioration of the polyol component can be avoided when the tackifier is dissolved in the polyol component.

The tackifier content is preferably in the range of 1 to 20 wt % of the heat-curable polyurethane composition. If the tackifier content is lower than 1 wt %, the resulting optically clear adhesive sheet may exhibit insufficient adhesive strength, especially in high-temperature, high-humidity environments. If the tackifier content is higher than 20 wt %, the tackifier may inhibit the reaction between the polyol component and the polyisocyanate component to cause insufficient urethane crosslinking during curing of the heat-curable polyurethane composition. As a result, the resulting optically clear adhesive sheet may be melted and deformed or cause tackifier separation (bleeding) in high-temperature, high-humidity environments. Also, the reaction time for the polyol component and the polyisocyanate component could be lengthened to allow sufficient urethane crosslinking, but this deteriorates the productivity.

[Plasticizer]

The heat-curable polyurethane composition in the present invention may further contain a plasticizer. Addition of a plasticizer decreases the rigidity, thereby improving the handleability of the optically clear adhesive sheet of the present invention and the capability of the optically clear adhesive sheet to conform to uneven surfaces. The addition of a plasticizer may possibly reduce the adhesive strength, but the optically clear adhesive sheet of the present invention, even with such reduced adhesive strength, can ensure sufficient adhesive strength.

The plasticizer may be any compound that is used to impart flexibility to a thermoplastic resin, and preferably contains a carboxylic acid-based plasticizer in terms of compatibility and weather resistance. Examples of the carboxylic acid-based plasticizer include phthalic esters (phthalic acid-based plasticizers) (e.g., diundecyl phthalate, dioctyl phthalate, diisononyl phthalate, diisodecyl phthalate, and dibutyl phthalate); 1,2-cyclohexanedicarboxylic acid diisononyl ester; adipic acid esters; trimellitic acid esters; maleic acid esters; benzoic acid esters; and poly-α-olefin. These may be used alone or in combination with each other. Known examples of the carboxylic acid-based plasticizer include "DINCH" available from BASF, "SANSO CIZER DUP" available from New Japan Chemical Co., Ltd., and "Durasyne 148" available from Ineous Oligomers.

[Catalyst]

The heat-curable polyurethane composition in the present invention may further contain a catalyst. The catalyst may be any catalyst that is used in a urethane modification reaction. Examples thereof include organotin compounds (e.g., di-n-butyltin dilaurate, dimethyltin dilaurate, dibutyltin oxide, tin octanoate); organotitanium compounds; organozirconium compounds; tin carboxylates; bismuth carboxylates; and amine-based catalysts (e.g., triethylene diamine).

The catalyst is preferably a non-amine-based catalyst. In the case of using an amine-based catalyst, the optically clear adhesive sheet may be easily discolored. More preferred as the catalyst is dimethyltin dilaurate.

The amount of the catalyst added is preferably in the range of 0.01 to 0.1 wt % of the total amount of the polyol component and the polyisocyanate component.

[Monoisocyanate Component]

The heat-curable polyurethane composition may further contain a monoisocyanate component. Containing a monoisocyanate component, the heat-curable polyurethane composition can give enhanced adhesive strength to the optically clear adhesive sheet in high-temperature, high-humidity environments without reduction in the flexibility required for the sheet. In the case where the heat-curable polyurethane composition has an a ratio of 1 or higher, the monoisocyanate component is preferably used to prevent residual unreacted OH groups in the resulting cured product.

The monoisocyanate component is a compound containing one isocyanate group in a molecule. Specific examples thereof include octadecyl diisocyanate (ODI), 2-methacryloyloxyethyl isocyanate (MOI), 2-acryloyloxyethyl isocyanate (AOI), octyl isocyanate, heptyl isocyanate, ethyl 3-isocyanatopropionate, cyclopentyl isocyanate, cyclohexyl isocyanate, 1-isocyanato-2-methoxyethane, ethyl isocyanatoacetate, butyl isocyanatoacetate, and p-toluenesulfonyl isocyanate. These may be used alone or in combination with each other. The monoisocyanate component is preferably 2-methacryloyloxyethyl isocyanate (MOI). This is because MOI has good compatibility with the polyol component and has high hydrophobicity.

Still, in the case where the heat-curable polyurethane composition contains a monoisocyanate component, the monoisocyanate component may undesirably modify the urethane skeleton to deteriorate the characteristics of the resulting sheet. In addition, the monoisocyanate component, if contained in an excess amount, may react with moisture in the air to cause foaming. For these reasons, in consideration of the robustness of the design in production of the optically clear adhesive sheet of the present invention, the heat-curable polyurethane composition preferably contains no monoisocyanate component.

The heat-curable polyurethane composition may contain, as necessary, various additives such as colorants, stabilizers, antioxidants, antifungal agents, and flame retardants as long as the characteristics required for the optically clear adhesive sheet are not deteriorated.

The optically clear adhesive sheet of the present invention preferably has, but is not particularly limited to, a thickness in the range of 50 to 2000 μm. The optically clear adhesive sheet having a thickness of less than 50 μm, when one of its surfaces is bonded to the surface of an optical member, may not be able to conform to a rough, uneven surface of the optical member. As a result, the other surface of the optically clear adhesive sheet may fail to be bonded to another optical member with a sufficient adhesive strength. The optically clear adhesive sheet having a thickness of more than 2000 μm may be insufficient in optical characteristics such as haze and total light transmittance. The lower limit of the thickness of the optically clear adhesive sheet is more preferably 100 μm, still more preferably 200 μm, particularly preferably 250 μm. The upper limit of the thickness of the optically clear adhesive sheet is more preferably 1500 μm, still more preferably 1000 μm. The optically clear adhesive sheet preferably has a thickness that is triple or more the height of the highest peak of a rough, uneven bonding surface of the adherend.

The optically clear adhesive sheet of the present invention preferably has a haze of 1% or lower and a total light transmittance of 90% or higher in order to have the optically clear adhesive sheet characteristics. The haze and the total light transmittance can each be measured with, for example, a turbidity meter "Haze Meter NDH2000" available from Nippon Denshoku Industries Co., Ltd. The haze is measured by a process in accordance with JIS K 7136, and the total light transmittance is measured by a process in accordance with JIS K 7361-1.

The optically clear adhesive sheet of the present invention preferably has an adhesive strength, measured by a 180° peel test, of 2 N/25 mm or more, more preferably 5 N/25 mm or more, still more preferably 10 N/25 mm or more, in normal-temperature, normal-humidity environments. Also, the sheet preferably has an adhesive strength of preferably 1.0 N/25 mm or more in high-temperature, high-humidity environments. The adhesive strength measured by the 180° peel test is more preferably in the range of 10 to 15 N/25 mm in normal-temperature, normal-humidity environments. The adhesive strength is also more preferably in the range of 4 to 15 N/25 mm, still more preferably in the range of 10 to 15 N/25 mm, in high-temperature, high-humidity environments. The optically clear adhesive sheet having an adhesive strength of 15 N/25 mm or less, when used to bond an optical member such as a touchscreen to another optical member, can be peeled off without adhesive residue, exhibiting excellent reworkability. If the adhesive strength of the optically clear adhesive sheet is very high, it may be difficult to remove air bubbles present between the optically clear adhesive sheet and the adherend. The details of the 180° peel test are described below.

The optically clear adhesive sheet of the present invention preferably has a micro rubber hardness (type A) in the range of 0.5° to 25°. The optically clear adhesive sheet having a micro rubber hardness (type A) of lower than 0.5° may exhibit low handleability in use (during bonding of an optical member) and may be deformed. In contrast, the optically clear adhesive sheet having a micro rubber hardness (type A) of higher than 25° may exhibit low flexibility and, during bonding of an optical member, may fail to conform to the surface shape of the optical member and include air between itself and the optical member. This may eventually cause peeling of the sheet from the optical member. Also, the optically clear adhesive sheet having low flexibility may fail to conform to an uneven surface on which the bezel is present, during bonding of an optical member such as a touchscreen to the display panel. The optically clear adhesive sheet more preferably has a micro rubber hardness (type A) in the range of 0.5° to 15°. The micro rubber hardness (type A) can be measured with, for example, a micro durometer "MD-1 Type A" available from Kobunshi Keiki Co., Ltd. The micro durometer "MD-1 Type A" is a durometer designed and produced as an approximately ⅕-sized compact model of a spring type A durometer, and is capable of giving the same measurement result as a spring type A durometer even when the measuring object is thin.

The optically clear adhesive sheet of the present invention may have a release liner on each surface. A laminate including the optically clear adhesive sheet of the present invention, a first release liner covering one surface of the optically clear adhesive sheet, and a second release liner covering the other surface of the optically clear adhesive sheet (hereinafter, such a laminate is referred to as "the laminate of the present invention") is also one embodiment of the present invention. The first and second release liners can protect the surfaces of the optically clear adhesive sheet of the present invention until immediately before being bonded to an adherend. The release liners therefore prevent deterioration of adhesion and sticking of foreign matters. Also, the surfaces can be prevented from being bonded to something other than the adherend, so that the handleability of the optically clear adhesive sheet of the present invention can be improved.

The first and second release liners can each be, for example, a polyethylene terephthalate (PET) film. The materials of the first release liner and the second release liner may be the same as or different from each other, and the thicknesses thereof may also be the same as or different from each other.

The bonding strength (peel strength) between the optically clear adhesive sheet of the present invention and the first release liner and the bonding strength between the optically clear adhesive sheet of the present invention and the second release liner are preferably different from each other. Such a difference in bonding strength makes it easy to peel one of the first and second release liners (release liner with lower bonding strength) alone from the laminate of the present invention and bond the exposed first surface of the optically clear adhesive sheet and the first adherend to each other, followed by peeling the other of the first and second release liners (release liner with higher bonding strength) and then bonding the exposed second surface of the optically clear adhesive sheet and the second adherend to each other.

Easy-peel treatment (release treatment) may be conducted on one or both of the surface of the first release liner coming into contact with the optically clear adhesive sheet of the present invention and the surface of the second release liner coming into contact with the optically clear adhesive sheet of the present invention. Examples of the easy-peel treatment include siliconizing.

Application of the optically clear adhesive sheet of the present invention may be, but is not particularly limited to, bonding of members such as a display panel, a touchscreen, and a cover panel to each other, for example. A display device with a touchscreen including the optically clear adhesive sheet of the present invention, a display panel, and a touchscreen (hereinafter, such a display device is also referred to as "the display device with a touchscreen according to the present invention") is also one aspect of the present invention.

FIG. 1 shows a schematic cross-sectional view of an exemplary display device with a touchscreen which includes the optically clear adhesive sheet of the present invention. A display device 10 shown in FIG. 1 includes a display panel 11, an optically clear adhesive sheet 12, a touchscreen (glass substrate with an ITO transparent conductive film) 13, another optically clear adhesive sheet 12, and a transparent cover panel 14 stacked in the given order. The three optical members, namely the display panel 11, the touchscreen 13, and the transparent cover panel 14, are integrated into one member with the two optically clear adhesive sheets 12 of the present invention. The display panel 11 can be of any type, such as a liquid crystal panel or an organic electroluminescent panel (organic EL panel). The touchscreen 13 can be, for example, a resistive touchscreen or a capacitive touchscreen.

The display panel 11 is housed in a bezel (housing for the display panel 11) 11A provided with an opening on the display surface side. The outer edge of the opening of the bezel 11A has produced the uneven surface with peaks corresponding to the thickness of the bezel 11A. The optically clear adhesive sheet 12 bonded covers the display surface sides of the display panel 11 and the bezel 11A to conform to the uneven surface with peaks corresponding to the thickness of the bezel 11A. In order to conform to the uneven surface with peaks corresponding to the thickness of the bezel, the optically clear adhesive sheet 12 is required to have flexibility and to be thicker than the bezel. For example, in the case where the peaks of the uneven surface formed by the bezel 11A have a height of 200 μm, the optically clear adhesive sheet used to bond an optical member to the display panel 11 housed in the bezel 11A preferably has a thickness of 600 μm or larger. The optically clear adhesive sheet of the present invention exhibits sufficient optical characteristics and flexibility even in the case of having a thickness of 600 μm or larger, and is therefore suited to bonding of an optical member to the display panel 11 housed in the bezel 11A.

The optically clear adhesive sheet of the present invention employed in such a display device is less likely to decrease in the adhesive strength under various conditions, and enables lasting, tight bonding of the optical members. As a result, no gap is formed between the optical members and the optically clear adhesive sheet, so that deterioration of visibility due to factors such as an increase in the interfacial reflection can be prevented. In particular, the optically clear adhesive sheet of the present invention is suitable for a display device incorporated into an automotive navigation system which needs to have high reliability, for example.

The optically clear adhesive sheet of the present invention may be produced by any method such as a method in which a heat-curable polyurethane composition is prepared, and then the composition is molded while being heat-cured by a known method. The method preferably includes the steps of preparing a heat-curable polyurethane composition by mixing a polyol component, a polyisocyanate component, and a tackifier with stirring, and curing the heat-curable polyurethane composition.

The following is a specific example of the production method. First, a masterbatch is prepared by adding a given amount of a tackifier to a polyol component and dissolving the tackifier by stirring while heating. The obtained masterbatch, an additional polyol component, and a polyisocyanate component as well as other components such as a catalyst as necessary are mixed with stirring using a mixer, for example, so that a liquid or gel heat-curable polyurethane composition is obtained. The heat-curable polyurethane composition is immediately fed into a molding machine such that the heat-curable polyurethane composition is crosslinked and cured while being transported in the state of being sandwiched between the first and second release liners. Thereby, the heat-curable polyurethane composition is semi-cured into a sheet integrated with the first and second release liners. The sheet is then crosslinked in a furnace for a given period of time, whereby an optically clear adhesive sheet formed of a cured product of a heat-curable polyurethane composition is obtained. Through these steps, the laminate of the present invention is formed.

Figure 2:
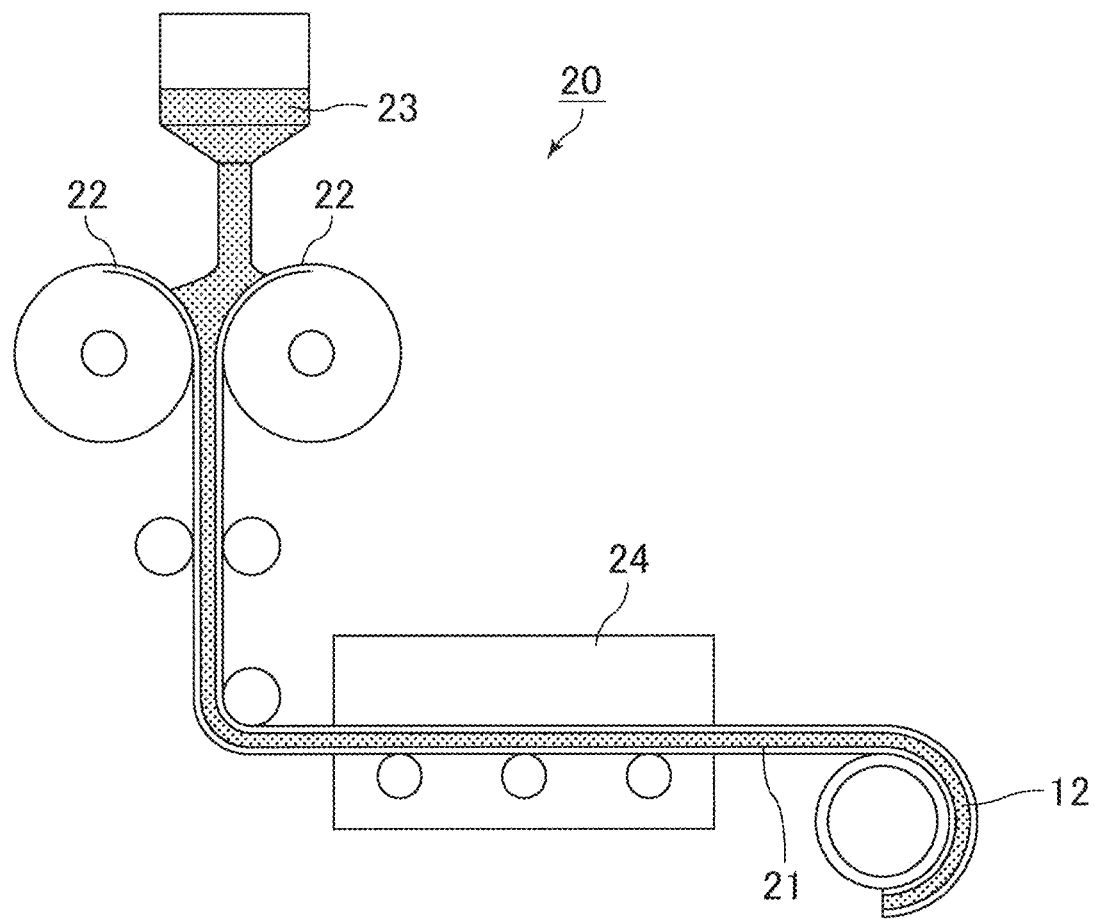
FIG. 2 shows a schematic view for describing an exemplary molding machine used in production of the optically clear adhesive sheet of the present invention.

FIG. 2 shows a schematic view for describing an exemplary molding machine used in production of the optically clear adhesive sheet of the present invention. In a molding machine 20 shown in FIG. 2, a liquid or gel uncured heat-curable polyurethane composition 23 is poured between paired release liners (PET films) 21 continuously fed by paired rollers 22 which are disposed with a space in between. With the heat-curable polyurethane composition 23 retained between the release liners 21, the composition is transported into a heating machine 24 while being cured (crosslinked). In the heating machine 24, the heat-curable polyurethane composition 23 is heat-cured while being retained between the release liners (PET films) 21, whereby molding of the optically clear adhesive sheet 12 formed of a cured product of a heat-curable polyurethane composition is completed.

The method for producing the optically clear adhesive sheet of the present invention may include, after preparation of an uncured heat-curable polyurethane composition, film formation using a general film-forming machine (e.g., any of various coating machines, bar coater, doctor blade) or by a film-forming treatment. The optically clear adhesive sheet of the present invention may alternatively be produced by centrifugal molding.

EXAMPLES

The present invention is described in more detailed below based on examples. The examples, however, are not intended to limit the scope of the present invention.
(Materials)
Materials used to prepare a heat-curable polyurethane composition in the following examples and comparative examples are listed below.
(A) Polyol Component
  Polyolefin polyol ("EPOL®" available from Idemitsu Kosan Co., Ltd., number average molecular weight: 2500)
  Polycarbonate polyol ("L34" available from Tosoh Corporation, number average molecular weight: 500)
(B) Polyisocyanate Component
  Hexamethylene diisocyanate (HDI)-based polyisocyanate A (Tosoh Corporation)
  HDI-based polyisocyanate B (Tosoh Corporation)
  HDI-based polyisocyanate C (Tosoh Corporation)
  HDI-based polyisocyanate D ("CORONATE 4022" available from Tosoh Corporation)
  Isophorone diisocyanate (IPDI)-based polyisocyanate ("Desmodur I" available from Sumika Bayer Urethane Co., Ltd.)
(C) Tackifier
  Hydrogenated petroleum resin-based tackifier ("I-MARV P-100" available from Idemitsu Kosan Co., Ltd.)
  Rosin diol-based tackifier ("KE-601" available from Arakawa Chemical Industries, Ltd.)
(D) Plasticizer
  Mixture of 80% 1,2-cyclohexanedicarboxylic acid diisononyl ester and 20% adipic acid-based polyester ("OFH 55" available from BASF, product obtained by substituting about 20% of "DINCH" available from BASF by the adipic acid-based polyester)
  1,2-Cyclohexane dicarboxylic acid diisononyl ester ("DINCH" available from BASF)
  Diundecyl phthalate ("SANSO CIZER DUP" available from New Japan Chemical Co., Ltd.)
  Poly-α-olefin ("Durasyn® 148" available from Ineous Oligomers, obtained by hydrogenating a 1-dodecene homopolymer)
(E) Catalyst
  Dimethyltin dilaurate ("Fomrez catalyst UL-28" available from Momentive)

The HDI-based polyisocyanates A to D are each obtained by reacting an ether polyol having six or more ethylene oxide units per molecule on average with HDI or a polyisocyanate synthesized from starting materials of HDI monomers. The amount of the ethylene oxide units (hydrophilic component) in the HDI-based polyisocyanate B is controlled to be ⅔ of that in the HDI-based polyisocyanate A by replacing the ethylene oxide units by a hydrophobic component such as polypropylene glycol (PPG) and controlling the molecular weight of the HDI-based polyisocyanate B to be substantially the same as that of the HDI-based polyisocyanate A. The amount of the ethylene oxide units in the HDI-based polyisocyanate C is controlled to be half of that in the HDI-based polyisocyanate B by replacing the ethylene oxide units by a hydrophobic component. The amount of the ethylene oxide units in the HDI-based polyisocyanate D is controlled to be significantly smaller than that in the HDI-based polyisocyanate A by replacing the ethylene oxide units by a hydrophobic component. The IPDI-based polyisocyanate contains no ethylene oxide units, and hardly contains a hydrophilic component.

Example 1

First, a solid hydrogenated petroleum resin-based tackifier (I-MARV P-100) was added to a polyolefin polyol (EPOL) whose temperature was controlled to 120° C., and the mixture was stirred so that a masterbatch containing a tackifier dissolved in a polyolefin polyol was obtained. Here, the tackifier content in the masterbatch was adjusted to 30 wt %. A polyolefin polyol (EPOL) (100 parts by weight), the HDI-based polyisocyanate B (36.5 parts by weight), the tackifier masterbatch (186.9 parts by weight), and the catalyst (dimethyl tin dilaurate) (0.02 parts by weight) were mixed with stirring using an oscillating model agitator "ajiter" for one and a half minutes. Thereby, a heat-curable polyurethane composition was prepared.

The obtained heat-curable polyurethane composition was fed into the molding machine 20 shown in FIG. 2. The heat-curable polyurethane composition was crosslinked and cured at a furnace temperature of 70° C. for a furnace time of 10 minutes while being transported in the state of being sandwiched between the paired release liners (PET films with release-treated surfaces) 21, and thereby a sheet with the release liners 21 was obtained. The sheet was crosslinked in the heating machine 24 whose temperature was adjusted to 70° C. for 12 hours, so that the optically clear adhesive sheet 12 having the release liner 21 on each surface and formed of a cured product of a heat-curable polyurethane composition (hereinafter, such a sheet is also referred to as an "optically clear adhesive sheet with release liners") was produced.

Figure 3:
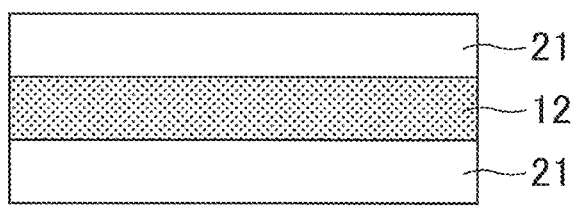
FIG. 3 shows a schematic cross-sectional view of an optically clear adhesive sheet with release liners of Example 1.

FIG. 3 shows a schematic cross-sectional view of an optically clear adhesive sheet with release liners of Example 1. As shown in FIG. 3, the obtained optically clear adhesive sheet with release liners was a laminate of the release liner 21, the optically clear adhesive sheet 12 formed of a cured product of a heat-curable polyurethane composition, and the release liner 21. The optically clear adhesive sheet 12 had a thickness of 300 μm.

Examples 2 to 8 and Comparative Examples 1 to 4

Optically clear adhesive sheets with release liners of Examples 2 to 8 and Comparative Examples 1 to 4 were each produced by a procedure similar to that in Example 1, except that the composition was changed as shown in the following Table 1. Example 8 is similar to Example 7, except that the thickness of the optically clear adhesive sheet 12 was changed to 1000 μm.

In Table 1, "HDI-based A" represents the "HDI-based polyisocyanate A", "HDI-based B" represents the "HDI-based polyisocyanate B", "HDI-based C" represents the "HDI-based polyisocyanate C", "HDI-based D" represents the "HDI-based polyisocyanate D", and "IPDI-based" represents the "IPDI-based polyisocyanate".

(Evaluation on Optically Clear Adhesive Sheet)

The following evaluations were conducted on the optically clear adhesive sheets with release liners in the examples and comparative examples: (1) micro rubber hardness (type A) measurement; (2) adhesive strength evaluation; (3) optical characteristics evaluation; (4) yellowness index evaluation after UV exposure; and (5) durability evaluation. The results are shown in Table 2.

(1) Micro Rubber Hardness (Type A) Measurement

The optically clear adhesive sheet with release liners was cut into samples each having a size of 75 mm (length)×25 mm (width). The hardness of each sample at normal temperature was measured with a micro durometer "MD-1 Type A" available from Kobunshi Keiki Co., Ltd. In this measurement, a cylindrical needle having a diameter of 0.16 mm and a height of 0.5 mm was used. In each of the examples and comparative examples, one sample was prepared and subjected to the measurement four times. The median of the obtained four measurement values was used as the measurement result in each of the examples and comparative examples.

(2) Adhesive Strength Evaluation

Figure 4A:
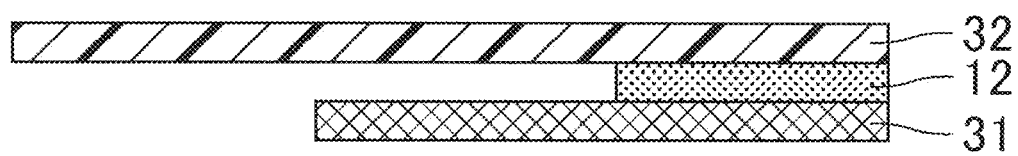
FIG. 4A and FIG. 4B show schematic views for describing the method for evaluating the adhesive strength of the optically clear adhesive sheets of examples and comparative examples.
Figure 4B:
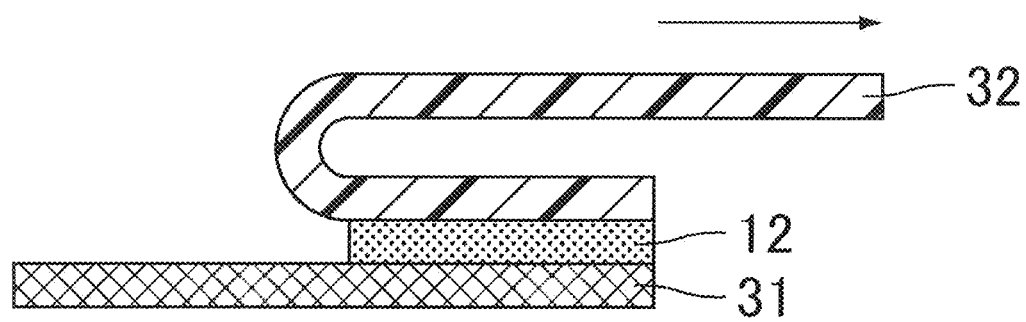

A 180° peel test was conducted by the following method to measure the adhesive strength (N/25 mm). FIG. 4A and FIG. 4B show schematic views for describing the method for evaluating the adhesive strength of the optically clear adhesive sheets of examples and comparative examples. The optically clear adhesive sheet with release liners produced in each of the examples and comparative examples was cut into

TABLE 1

| | | Example 1 | Example 2 | Example 3 | Example 4 | Example 5 | Example 6 | Examples 7 and 8 | Comparative Example 1 | Comparative Example 2 | Comparative Example 3 | Comparative Example 4 |
|---|---|---|---|---|---|---|---|---|---|---|---|---|
| (A) Polyol component | Product name | EPOL | EPOL | EPOL | EPOL | EPOL | EPOL | EPOL | L34 | EPOL | L34 | EPOL |
| | Amount (parts by weight) | 100 | 100 | 100 | 100 | 100 | 100 | 100 | 100 | 100 | 100 | 100 |
| (B) Polyisocyanate component | Product name | HDI-based B | HDI-based B | HDI-based B | HDI-based B | HDI-based C | HDI-based C | HDI-based D | HDI-based A | IPDI-based | HDI-based B | IPDI-based |
| | Amount (parts by weight) | 36.5 | 36.5 | 34.3 | 49.2 | 49.2 | 49.2 | 23.8 | 170.6 | 11.2 | 125.6 | 11.2 |
| (C) Tackifier masterbach | Product name | I-MARV P-100 | I-MARV P-100 | I-MARV P-100 | I-MARV P-100 | I-MARV P-100 | I-MARV P-100 | I-MARV P-100 | KE-601 | I-MARV P-100 | — | I-MARV P-100 |
| | Amount (parts by weight) | 186.9 | 186.9 | 195.7 | 151.6 | 151.6 | 151.6 | 679.1 | 41.6 | 497.8 | — | 497.8 |
| (D) Plasticizer | Product name | — | OFH 55 | OFH 55 | SANSO CIZER DUP | SANSO CIZER DUP | DINCH | — | — | Durasyn 148 | — | OFH 55 |
| | Amount (parts by weight) | — | 57.4 | 29.6 | 118.3 | 118.3 | 118.3 | — | — | 281.0 | — | 281.0 |
| (E) Catalyst | Product name | UL-28 | UL-28 | UL-28 | UL-28 | UL-28 | UL-28 | UL-28 | UL-28 | UL-28 | UL-28 | UL-28 |
| | Amount (parts by weight) | 0.02 | 0.02 | 0.02 | 0.06 | 0.06 | 0.06 | 0.04 | 0.12 | 0.13 | 0.09 | 0.13 |
| α ratio | | 1.7 | 1.7 | 1.8 | 1.3 | 1.3 | 1.3 | 1.9 | 1.4 | 1.3 | 1.4 | 1.3 | a sample having a size of 75 mm (length)×25 mm (width). One of the release liners of this sample was peeled off, and the exposed optically clear adhesive sheet 12 of the sample was bonded to a microscope slide 31 having a size of 75 mm (length)×25 mm (width). The members were retained in this state under a pressure of 0.4 MPa for 30 minutes, so that the optically clear adhesive sheet 12 and the microscope slide 31 were bonded to each other. The other release liner on the side opposite to the microscope slide 31 was then peeled off, and a PET sheet ("Melinex® S" available from Teijin DuPont Films) 32 having a thickness of 125 µm was bonded to the surface of the optically clear adhesive sheet 12 on the side opposite to the microscope slide 31 as shown in FIG. 4A.

The sample was then left to stand in a normal-temperature, normal-humidity environment (temperature: 23° C., humidity: 50%) for 12 hours. The adhesive strength of the optically clear adhesive sheet 12 to the microscope slide 31 was measured by pulling the PET sheet 32 in a 180° direction as shown in FIG. 4B such that the optically clear adhesive sheet 12 was separated from the microscope slide 31 at the interface therebetween. In each of the examples and comparative examples, two samples were prepared for the measurement. The average of the obtained two measurement values was used as the measurement result in each of the examples and comparative examples.

(3) Optical Characteristics Evaluation

One of the release liners of the optically clear adhesive sheet with release liners was peeled off, and the exposed optically clear adhesive sheet of the sample was bonded to a microscope slide. The members were retained in this state under a pressure of 0.4 MPa for 30 minutes, so that the optically clear adhesive sheet and the microscope slide were bonded to each other. The other release liner on the side opposite to the microscope slide was then peeled off, and the following measurements were performed.

(3-1) Haze Measurement

The haze was measured by a method in conformity with JIS K 7136 using a turbidity meter "Haze Meter NDH2000" available from Nippon Denshoku Industries Co., Ltd. In each of the examples and comparative examples, three samples were prepared and subjected to the measurement in a normal-temperature, normal-humidity environment. The average of the obtained three measurement values was used as the measurement result in each of the examples and comparative examples.

(3-2) Total Light Transmittance Measurement

The total light transmittance was measured by a method in conformity with JIS K 7361-1 using a turbidity meter "Haze Meter NDH2000" available from Nippon Denshoku Industries Co., Ltd. In each of the examples and comparative examples, three samples were prepared and subjected to the measurement in a normal-temperature, normal-humidity environment. The average of the obtained three measurement values was used as the measurement result in each of the examples and comparative examples.

(4) Yellowness Index Evaluation after UV Exposure

The release liner on each surface of the optically clear adhesive sheet with release liners was peeled off, and a sample with the optically clear adhesive sheet sandwiched between microscope slides was prepared. This sample was exposed to an environment with an irradiation wavelength of 300 to 400 nm, irradiance of 68 W/m$^2$, and a temperature fixed at 60° C. (without rain) for 72 hours using a super xenon weather meter. Then, the yellowness index was evaluated based on the $\Delta$YI value obtained using a color meter ("Colour Cute i" available from Suga Test Instruments Co., Ltd.) as an evaluation index. The target value of the yellowness index after UV exposure was 1.0 or lower because optically clear adhesive sheets are desired to keep their transparency even after being exposed to UV light for a long period of time (e.g., for 10 years) in on-board applications, for example.

(5) Durability Evaluation

One of the release liners of each optically clear adhesive sheet with release liners was peeled off, and the exposed optically clear adhesive sheet of the sample was bonded to a microscope slide (made of soda-lime glass). The members were retained in this state under a pressure of 0.4 MPa for 30 minutes, so that the optically clear adhesive sheet and the microscope slide were bonded to each other. The other release liner on the side opposite to the microscope slide was then peeled off. The resulting samples were left to stand, one in a high-temperature, normal-humidity environment (95° C.) and the other in a high-temperature, high-humidity environment (85° C., 85%), each for 168 hours. Thereafter, the optically clear adhesive sheets were visually observed. Here, in the high-temperature, normal-humidity environment, the temperature was set to 95° C. using a convection oven, but the humidity was not controlled.

TABLE 2

| Evaluation item | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|
| Micro rubber hardness (type A) (°) | | 9.2 | 3.1 | 2.8 | 8.6 | 9.4 | 10 | 0.8 | 0.8 | 11.5 | 6.8 | 3.9 | 4.1 |
| Adhesion | Adhesive strength in normal-temperature, normal-humidity environment (N/25 mm) | 8.5 | 3.1 | 6.3 | 0.2 | 0.1 | 0.1 | 5.0 | 8.0 | 12.8 | 1.7 | 8.4 | 0.1 |
| Optical characteristics | Haze (%) | 0.31 | 0.22 | 0.20 | 0.48 | 0.23 | 0.62 | 0.1 | 0.2 | 0.30 | 0.25 | 0.11 | 0.24 |
| | Total light transmittance (%) | 91.5 | 91.5 | 91.6 | 91.5 | 92.0 | 91.6 | 91.9 | 91.8 | 92.1 | 92.0 | 91.4 | 91.4 |

TABLE 2-continued

| Evaluation item | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|
| UV exposure | Yellowness index | 0.37 | 0.38 | 0.40 | 0.58 | 0.57 | 0.38 | 0.35 | 0.49 | 0.57 | 0.39 | 0.50 | 0.39 |
| Durability | Appearance change in high-temperature, normal-humidity environment | None | None | None | None | None | None | None | None | Air bubbles generated | None | Air bubbles generated | None |
| | Appearance change in high-temperature, high-humidity environment | None | None | None | None | None | None | None | None | Air bubbles generated | Blushing occurred | Air bubbles generated | Blushing occurred |
| | Sheet deformation in high-temperature, high-humidity environment | None | None | None | None | None | None | None | None | None | None | None | None |

As shown in Tables 1 and 2, the optically clear adhesive sheets of Examples 1 to 8 were good in the micro rubber hardness (type A), adhesive strength, optical characteristics (transparency), yellowness index after UV exposure, and durability. In contrast, the optically clear adhesive sheets of Comparative Examples 1 and 3 whose polyol component was not a polyolefin polyol but a polycarbonate polyol were observed to generate air bubbles both in the high-temperature, normal-humidity environment and in the high-temperature, high-humidity environment. The optically clear adhesive sheets of Comparative Examples 2 and 4 whose polyisocyanate component was not an HDI-based polyisocyanate but an IPDI-based polyisocyanate caused whitening in the high-temperature, high-humidity environment.

The invention claimed is:

1. An optically clear adhesive sheet comprising:
a cured product of a heat-curable polyurethane composition, the heat-curable polyurethane composition containing a polyol component, a polyisocyanate component, a tackifier, and a catalyst;
the polyol component consists of polyols having an olefin skeleton, wherein the polyols having the olefin skeleton are the only polyol component in the heat-curable polyurethane composition,
the heat-curable polyurethane composition having an α ratio of 1.3 or higher and 1.9 or lower, wherein the α ratio is defined as number of moles of OH groups derived from the polyol component with respect to number of moles of NCO groups derived from the polyisocyanate component,
the polyisocyanate component being a modified polyisocyanate that is obtained by reacting an acyclic aliphatic and/or alicyclic polyisocyanate containing an isocyanate group with an ether compound containing an ethylene oxide unit,
an amount of the catalyst added is in a range of 0.01 to 0.1 wt % based on the total amount of the polyol component and the polyisocyanate component,
the tackifier is a hydrogenated petroleum resin obtained by hydrogenating a copolymer of dicyclopentadiene and an aromatic compound,
an amount of the tackifier is 1 wt % to 20 wt % with respect to the total amount of the heat-curable polyurethane composition,
the polyols having the olefin skeleton is (1) a polyolefin polyol obtained by hydrogenating a hydroxy group-terminated polyisoprene, or (2) both-end hydroxy group-terminated hydrogenated polybutadiene, or (3) polyhydroxy polyolefin oligomer, and a number average molecular weight of the polyol component is in a range of 500 to 3000, and
wherein a total light transmittance of the optically clear adhesive sheet is 90% or higher as measured by a process in accordance with JIS K 7361-1, and a haze of the optically clear adhesive sheet is 1% or lower as measured by a process in accordance with JIS K 7136.

2. The optically clear adhesive sheet according to claim 1, wherein the heat-curable polyurethane composition further contains a plasticizer.

3. The optically clear adhesive sheet according to claim 2, wherein the plasticizer contains a carboxylic acid-based plasticizer.

4. A method for producing the optically clear adhesive sheet according to claim 1, the method comprising the steps of:
preparing the heat-curable polyurethane composition by mixing the polyol component, the polyisocyanate component the catalyst, and the tackifier with stirring; and
curing the heat-curable polyurethane composition.

5. A laminate comprising:
the optically clear adhesive sheet according to claim 1;
a first release liner covering one surface of the optically clear adhesive sheet; and
a second release liner covering the other surface of the optically clear adhesive sheet.

6. A display device with a touchscreen, comprising:
the optically clear adhesive sheet according to claim 1;
a display panel; and
a touchscreen.

* * * * *